Dec. 12, 1967  D. B. ROESNER  3,357,044
PRODUCTION OF SHAPED ARTICLES
Filed April 6, 1966  2 Sheets-Sheet 1

INVENTOR
DONALD B. ROESNER
BY Hofgren, Wegner, Allen,
Stellman & McCord
ATTORNEYS

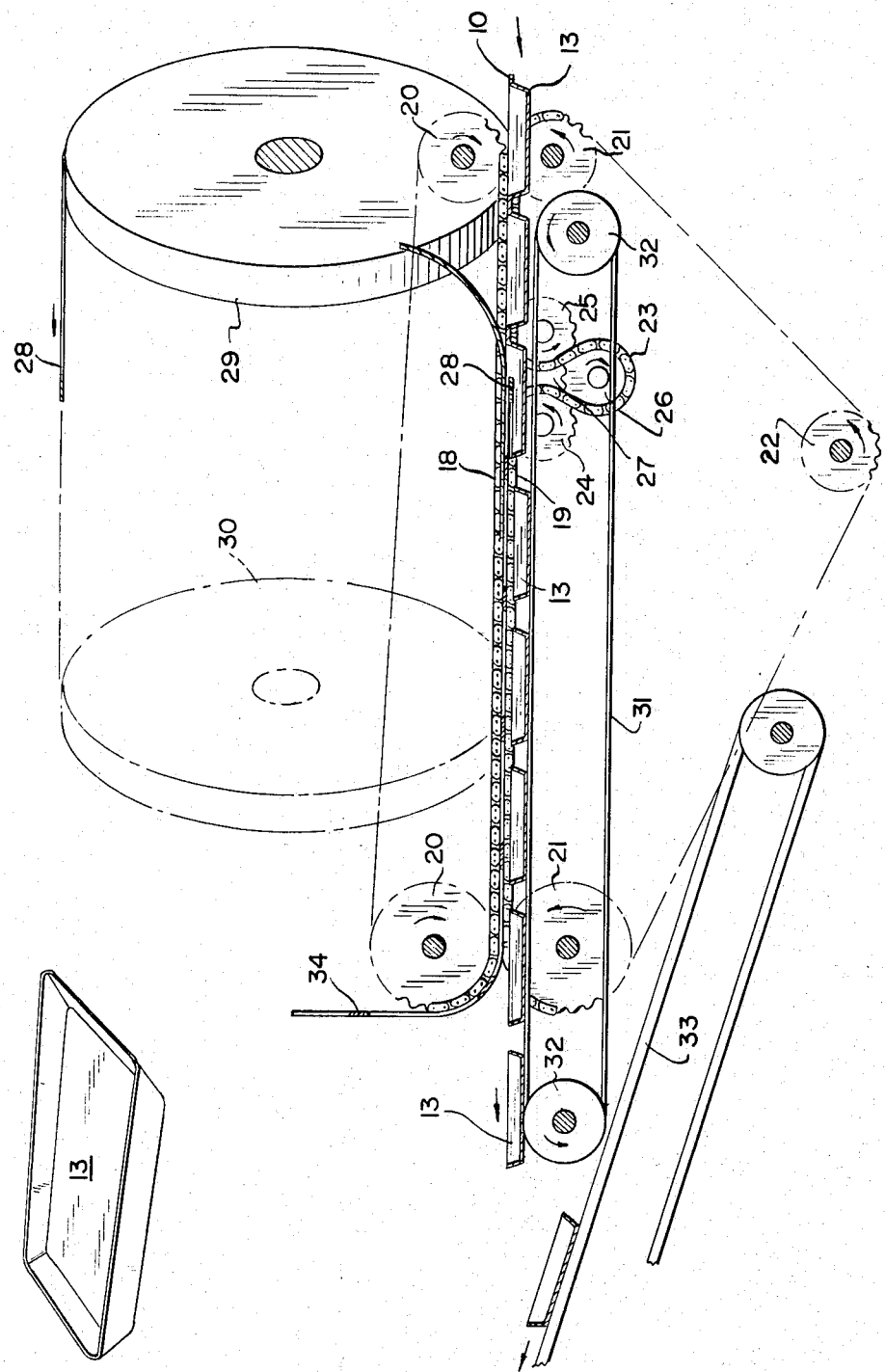

United States Patent Office 3,357,044
Patented Dec. 12, 1967

3,357,044
PRODUCTION OF SHAPED ARTICLES
Donald B. Roesner, Chicago, Ill., assignor to American Excelsior Corporation, a corporation of Delaware
Filed Apr. 6, 1966, Ser. No. 540,574
2 Claims. (Cl. 18—19)

ABSTRACT OF THE DISCLOSURE

An apparatus for producing a series of shaped articles from a continuous web or sheet of shapeable material in which the web or sheet is moved in a path during which the web is shaped to produce the articles projecting from the web, followed by an apparatus for separating as by cutting the articles from the web during the movement to produce a series of articles and a continuous web remainder, the separating apparatus being movable continuously in a transverse path, the apparatus also including a device for conducting the web remainder minus the removed articles away from the separating device and an apparatus for conducting the articles themselves away from the separating device.

---

This invention relates to an apparatus for producing a series of shaped articles from a continuous web of shapeable material.

It has become common practice to manufacture articles from shapeable or deformable material such as plastic sheet material by molding the articles in the material and then severing the material to produce a series of shaped articles. An excellent example of this is the trays commonly found in supermarkets to hold preportioned foods such as meats and vegetables for sale. Because shaped articles of this type are used in large numbers, it is economically important to manufacture them as rapidly as possible and as automatically as possible.

One of the features of this invention is to provide an apparatus for producing a series of shaped articles from a continuous web of shapeable material in which the web is shaped to produce the articles projecting from the web and then separating the articles from the web during movement of the web to produce the series of articles and the continuous web remainder minus the articles together with means for conducting both the web remainder and the series of articles away from the means for separating.

Other features and advantages of the invention will be apparent from the following description of one embodiment thereof as illustrated in the accompanying drawings. Of the drawings:

FIGURE 3 is a semi-diagrammatic side elevational view partially in section of the apparatus of FIGURE 2.

FIGURE 4 is a perspective view of one of the separated shallow plastic trays produced by the apparatus embodied in the drawings.

Figure 1:
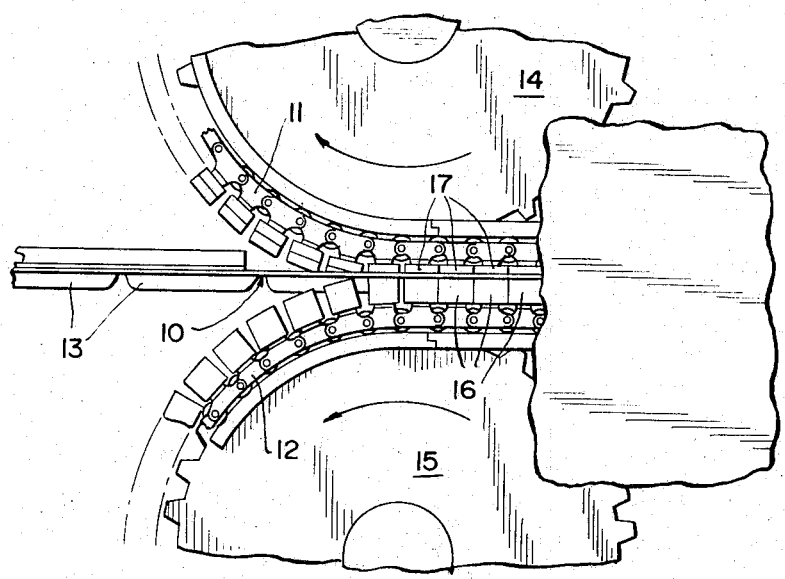
FIGURE 1 is a fragmentary side elevational view of the exit end of an apparatus for molding shallow plastic trays from a continuous web of plastic material.

In the apparatus illustrated in the accompanying drawings an elongated web 10 of plastic material that is shapeable or moldable, of which cellular polystyrene sheet is an excellent example, is passed between cooperating molding means 11 and 12 to produce the shaped trays 13 projecting from the web 10. The molding means 11 and 12 are each guided in a closed path by sprocket wheels 14 and 15 and are made up of cooperating mold sections that are adjacent each other as illustrated at 16 and 17 during the molding or shaping of the web 10 to produce the trays 13 but that are separable from each other as shown in FIGURE 1 while being returned by the wheels 14 and 15 for a new molding pass. A molding or shaping apparatus of this type is described in greater detail and claimed in the copending application of D. J. Gasch et al. Ser. No. 476,831, filed Aug. 3, 1965, and assigned to the assignee as the present application.

As the web 10 with the projecting tray sections 13 therein leaves the mold sections 16 and 17 the web is guided in a linear path by upper 18 and lower 19 endless sprocket chains. The upper sprocket chain 18 is guided in a closed path over sprockets 20 while the lower chain 19 is guided in an endless path over sprockets 21 and 22. The lower guiding chain 19 is directed in a downward loop 23 by cooperating sprockets 24, 25 and 26 to provide an open space 27 at the top of the loop.

Figure 2:
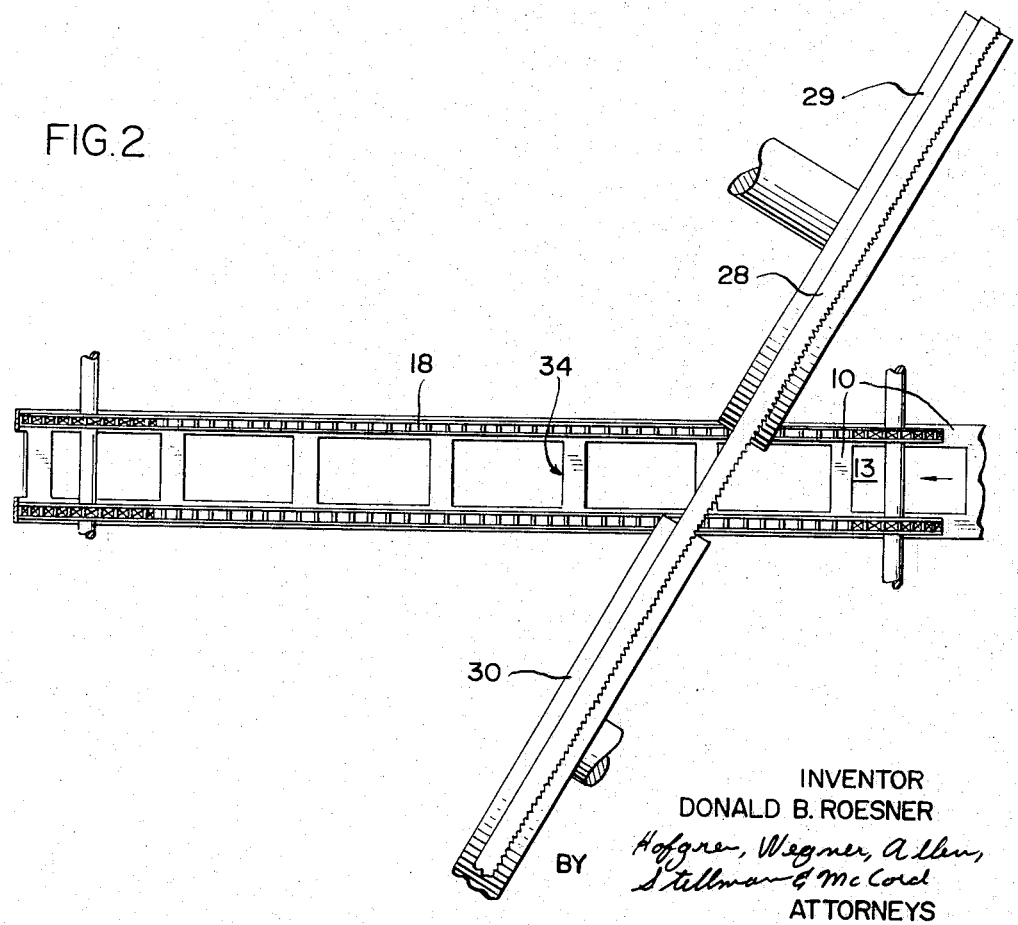
FIGURE 2 is a semi-diagrammatic plan view illustrating a means for separating the trays from the web during travel thereof from the molding apparatus of FIGURE 1.

In order to separate the articles 13 from the web 10 there is provided a means for separating here shown as an endless severing band saw 28 arranged for rotation around spaced guide wheels 29 and 30. As is shown most clearly in FIGURE 2, the wheels 29 and 30 are aligned and are arranged so as to direct the band saw 28 or severing means in a path that is transverse to the path of travel of the plastic web 10. The severing portion of the band saw is the bottom thereof as shown in FIGURE 3 and this bottom portion extends through the open space 27 formed by the chain loop 23 previously described.

With this arrangement the conveyor chains 18 and 19 convey the web 10 with the downwardly projecting articles 13 from the molding apparatus of FIGURE 1. Then, during this movement the band saw 28 which is arranged transversely to the path of movement of the web 10 servers the articles or trays 13 from the remainder of the web. These articles are conducted away from the severing means by a conducting means here shown as the belt conveyor 31 that is guided over pulleys 32 and that dumps the thusly produced trays 13 onto a second lower conveyor 33 which carries them to a place of disposal such as a place for arranging them in packages of a series of trays each. In the meantime, the remainder 34 of the web after the trays 13 have been severed by the saw 28 is conducted as indicated in FIGURE 3 to a place of disposal such as one where it can be packaged for use as scrap material.

As can be seen from the above description, the apparatus of this invention provides a simple yet fast operating means for producing a series of shaped articles from a moving web containing the articles. During the movement of the web a separating means separates the articles from the web with the articles then being conducted away from the separating means by one portion of the apparatus and the remainder of the web minus the articles being conducted away from the separating means by another portion of the apparatus. As can be readily realized, this apparatus permits producing articles such as plastic trays at an extremely high rate and with a minimum of labor yet with simple and uncomplicated machinery.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:
1. Apparatus for producing a series of shaped articles from a continuous web of shapeable material, comprising: means for moving said web in a path; means for shaping said web during said movement thereof to pro- duce said articles projecting from said web; means for separating said articles from said web during said movement to produce said series of articles and a continuous web remainder minus said articles, said means for separating comprising a severing member movable continuously in a path arranged transversely to said web path and intersecting said web path; means for conducting said web remainder away from said means for separating; and means for conducting said articles away from said means for separating.

2. The apparatus of claim 1 wherein said means for conducting said articles comprises conveyor means arranged beneath said web path and said means for severing for gravity fall of said articles onto said conveyor means.

References Cited

UNITED STATES PATENTS

| | | |
|---|---|---|
| 2,229,613 | 1/1941 | Strauch _____ 18—19 |
| 2,896,387 | 7/1959 | Brock. |
| 2,915,784 | 12/1959 | Gora. |
| 2,935,828 | 5/1960 | Mahaffy et al. |
| 2,989,775 | 6/1961 | Pekarek _____ 18—4 |
| 3,027,596 | 4/1962 | Knowles _____ 18—19 |
| 3,186,271 | 1/1965 | Kaiser _____ 18—2 |
| 3,238,565 | 3/1966 | Jacobs _____ 18—4 |
| 3,240,851 | 3/1966 | Scalora _____ 18—19 |
| 3,244,779 | 4/1966 | Levey et al. _____ 18—19 |

WILLIAM J. STEPHENSON, *Primary Examiner.*